UNITED STATES PATENT OFFICE.

JOHN L. NOVARINE, OF BROOKLYN, NEW YORK, ASSIGNOR OF ONE-HALF TO STEARNS & GORDON, OF JERSEY CITY, NEW JERSEY.

PROCESS OF OBTAINING VANILLIN.

SPECIFICATION forming part of Letters Patent No. 565,918, dated August 18, 1896.

Application filed August 29, 1895. Serial No. 560,913. (Specimens.)

*To all whom it may concern:*

Be it known that I, JOHN L. NOVARINE, a citizen of the Republic of Switzerland, residing at Brooklyn, in the county of Kings and State of New York, have invented certain new and useful Improvements in the Manufacture of Vanillin, of which the following is a specification.

The object of this invention is to produce an improved process of manufacturing vanillin synthetically, in which dichlorochromyl-eugenic compounds which are obtained from eugenol is the initial or starting substance, and by which vanillin is produced in a better and cheaper manner than by the processes heretofore known.

The invention consists of a process of producing vanillin by the following steps: first, subjecting a solution of eugenol or its derivatives in a suitable solvent to the action of a solution of chromylchlorid in the same solvent, so as to obtain a dichlorochromyl-eugenic compound, next decomposing the same by water, extracting the products of the reaction by means of ether or benzene and isolating the vanillin or its ether from the solution so obtained by any of the known methods.

The invention consists, secondly, of the process of making dichlorochromyl-eugenic compounds.

The invention consists, thirdly, of the dichlorochromyl-eugenic compounds referred to, which contain two molecules of chromyl-chlorid to one molecule of the eugenic compound, and which have a brown or greenish-brown color, and which form a more or less crystalline powder which is easily decomposed by water.

In carrying out my improved process of producing vanillin from eugenol a solution of a combination of eugenol or a derivative of the same, such as an ether or a combination with a metal is dissolved in a suitable solvent, such as a carbon bisulfid or chloroform. This solution is then subjected to the action of a solution of chromylchlorid (chlorochromic acid) in the same solvent, by which an immediate reaction is produced. The products of the reaction are then filtered, washed, and dried. They are either dichlorochromyl-eugenol or a corresponding eugenic compound, according as an ether or metal compound is originally used, as, for instance, dichlorochromyl-eugenol, dichlorochromyl-sodium-eugenol, dichlorochromyl-acetyl-eugenol, dichlorochromyl-benzoyl-eugenol, dichlorochromyl-benzyl-eugenol. Other similar combinations of chromylchlorid with various derivatives of eugenol may thus be obtained, as I do not desire to confine myself to any specific double compound of chromylchlorid with a eugenol derivative. The dichlorochromyl-eugenic compound is next decomposed by means of water, and this product of the reaction is then extracted by means of ether or benzene and the vanillin or its ether isolated from the solution so obtained by any of the well-known methods heretofore in use.

The following formulæ illustrate the reactions referred to:

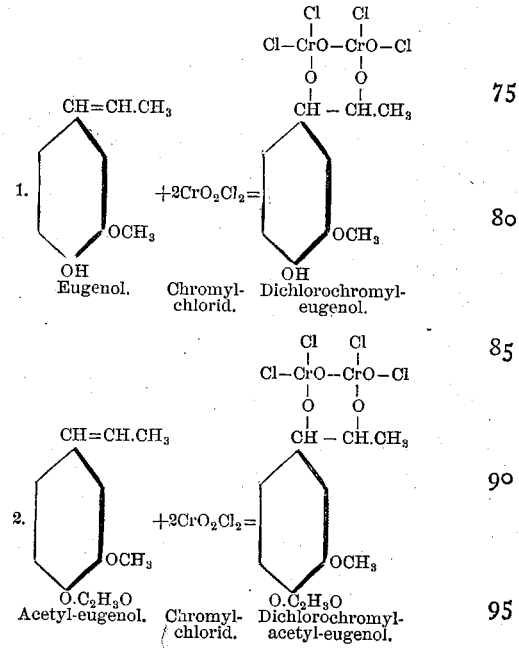

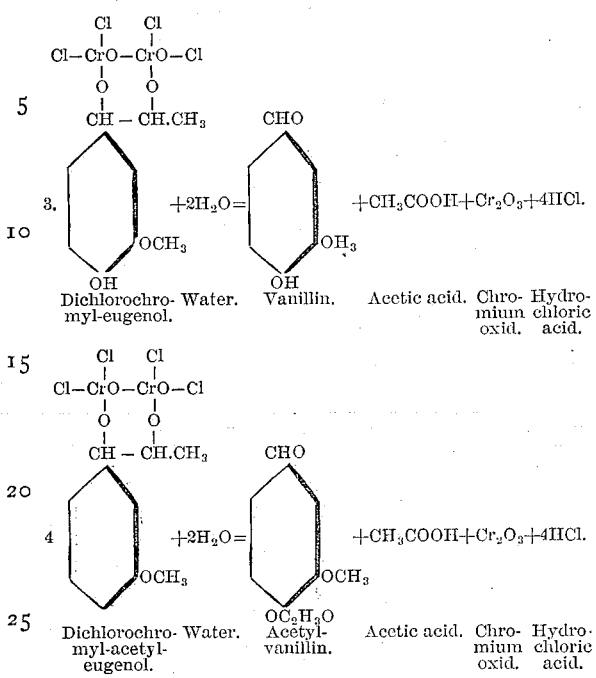

Formula 1 shows the action of chromychlorid on eugenol. Formula 2, the same reaction with an ether of eugenol, while formulæ 3 and 4 represent the main reactions corresponding to the formulæ 1 and 2, respectively, and show how the molecules are grouped around the eugenol-ring.

The equations 3 and 4 are intended to show the chemical change which the principal group of the benzene ring undergoes when subjected to the influence of water, namely, its total destruction and transformation into chromic oxid and hydrochloric acid, while the oxygen set free serves to divide and oxidize the eugenol group, partly into vanillin, partly into acetic acid.

In carrying out the process the quantities used correspond to the molecular proportions, namely, for every molecule of eugenol or its derivative two molecules of chromylchlorid have to be used.

The dichlorochromyl-eugenic compound, which is obtained by the reaction of chromylchlorid on eugenol or a derivative of the same, contains, therefore, for every molecule of the eugenic compound two molecules of chromylchlorid, and is obtained as a more or less crystalline powder having a brown or greenish-brown color, which powder is readily decomposed by water on which peculiar characteristic the second reaction is based.

The main advantage of my improved process of making vanillin is that the proportionate yield of vanillin is much larger than in the processes heretofore used, whereby the cost of the same is reduced. This advantage is obtained by the new grouping of the molecules effected by my process. Heretofore the characteristic changes in the grouping of the molecules were brought out in the hydroxyl group, while in my process the modification in said grouping is produced in the hydrocarbon group of the eugenol molecule. The process can be carried out directly with little difficulty, the result being a vanillin which is equal to any of the known vanillins in the market.

Having thus described my invention, I claim as new and desire to secure by Letters Patent—

1. The process of producing vanillin herewith described, consisting of the following steps: first, subjecting a solution of eugenol to the action of a solution of chromylchlorid, decomposing the dichlorochromyl-eugenic compound thus obtained by means of water, extracting the products of the reaction and isolating the vanillin by any known method, substantially as set forth.

2. In the art of producing vanillin from eugenol, the process of making the dichlorochromyl-eugenic compound by subjecting a solution of eugenol to the action of a solution of chromylchlorid, substantially as set forth.

3. The dichlorochromyl-eugenic compound herein described containing two molecules of chromylchlorid to one molecule of the eugenic compound, having a brown or greenish-brown color, and forming a more or less crystalline powder which is easily decomposed by water, substantially as set forth.

In testimony that I claim the foregoing as my invention I have signed my name in presence of two subscribing witnesses.

JOHN L. NOVARINE.

Witnesses:
PAUL GOEPEL,
GEORGE W. JAEKEL.